United States Patent
Lee et al.

(10) Patent No.: US 11,565,652 B2
(45) Date of Patent: Jan. 31, 2023

(54) EXTERNAL AIRBAG FOR VEHICLE

(71) Applicant: HYUNDAI MOBIS CO., LTD., Seoul (KR)

(72) Inventors: Seok Min Lee, Yongin-si (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/734,465

(22) Filed: May 2, 2022

(65) Prior Publication Data
US 2022/0348162 A1    Nov. 3, 2022

(30) Foreign Application Priority Data

May 3, 2021   (KR) .................. 10-2021-0057435
May 11, 2021  (KR) .................. 10-2021-0060785

(51) Int. Cl.
*B60R 21/36* (2011.01)
*B60R 21/0134* (2006.01)

(52) U.S. Cl.
CPC .......... *B60R 21/36* (2013.01); *B60R 21/0134* (2013.01)

(58) Field of Classification Search
None
See application file for complete search history.

(56) References Cited

U.S. PATENT DOCUMENTS

| | | | | |
|---|---|---|---|---|
| 5,732,785 | A * | 3/1998 | Ran ................. | B60R 19/205 180/274 |
| 7,325,642 | B2 * | 2/2008 | Roux ................ | B62D 25/161 180/274 |
| 10,308,212 | B2 * | 6/2019 | Wu .................. | B60R 19/205 |

FOREIGN PATENT DOCUMENTS

| | | | |
|---|---|---|---|
| DE | 10203287 A1 * | 8/2003 | .......... B60R 21/013 |
| DE | 102014106054 A1 * | 11/2014 | ............ B60K 28/10 |
| DE | 102017130826 A1 * | 7/2018 | ............ B60R 21/01 |
| KR | 101198842 B1 | 11/2012 | |

* cited by examiner

*Primary Examiner* — Faye M Fleming
(74) *Attorney, Agent, or Firm* — NovoTechIP International PLLC

(57) ABSTRACT

The present invention provides an external airbag system for a vehicle, the external airbag system including a detection sensor configured to detect an object moving at a rear or lateral side of a vehicle, an airbag cushion provided on a rear frame on which a door of the vehicle is mounted, the airbag cushion being configured to be deployed to extend in a leftward/rightward direction of the vehicle in a state in which the door of the vehicle is opened, and a control unit configured to perform control to deploy the airbag cushion when the detection sensor detects the object.

19 Claims, 14 Drawing Sheets

110(111,112,113)

EXTERNAL AIRBAG FOR VEHICLE

CROSS-REFERENCE TO RELATED APPLICATIONS

The present application claims priority to Korean Patent Application No. 10-2021-0057435, filed on May 3, 2021, and to Korean Patent Application No. 10-2021-0060785, filed on May 11, 2021, of which the disclosure is incorporated herein in their entirety.

BACKGROUND

1. Technical Field

The present invention relates to an external airbag for a vehicle, which is deployed to the outside of a vehicle.

2. Discussion of Related Art

A vehicle is equipped with various types of safety devices for protecting a driver and an occupant in a sudden emergency situation. A representative example of the safety device is an airbag device for directly protecting a driver or passenger seated in the vehicle.

The airbag device is an embedded airbag device designed to be inflated by airbag gas in the vehicle. The airbag device may protect the occupant in the vehicle but cannot protect a counterpart vehicle, persons outside the vehicle, or a host vehicle colliding with external objects. To solve the problem, in the related art, there has been proposed an external airbag device having an airbag cushion configured to be deployed toward a location in front of the vehicle in the event of a collision.

The external airbag in the related art has been developed to prepare for a frontal or broadside collision that occurs while the vehicle travels. However, there is a problem in that it is challenging to prepare for a collision of an object such as a two-wheeled vehicle moving from a rear side to a lateral side of the vehicle with an opened door of the vehicle.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide an external airbag configured to be deployed from a pillar at a door side of a vehicle to the outside of the vehicle, thereby preventing an object moving from a rear side to a lateral side of the vehicle from colliding with an opened door of the vehicle.

The present invention provides an external airbag system for a vehicle, the external airbag system including: a detection sensor configured to detect an object moving at a rear or lateral side of a vehicle; an airbag cushion provided on a rear frame on which a door of the vehicle is mounted, the airbag cushion being configured to be deployed to extend in a leftward/rightward direction of the vehicle in a state in which the door of the vehicle is opened; and a control unit configured to perform control to deploy the airbag cushion when the detection sensor detects the object.

The external airbag may further include an inflator connected to the airbag cushion and configured to deploy the airbag cushion by injecting gas into the airbag cushion.

The control unit may detect an opening angle of the door of the vehicle, and the control unit may deploy the airbag cushion when the door is opened at a preset opening angle or more and the detection sensor detects the object.

The control unit may deploy the airbag cushion when the detection sensor detects the object moving from the rear side to the lateral side of the vehicle and the door of the vehicle is opened.

The control unit may deploy the airbag cushion when the detection sensor detects the object moving from the rear side to the lateral side of the vehicle and the detection sensor detects that the object moves so that a relative distance between the object and the door is a preset braking distance or less.

The external airbag system may further include: a housing configured to accommodate the airbag cushion therein; and a mounting unit coupled to the housing and mounted on the rear frame on which the door of the vehicle is mounted.

The housing may include a cover configured to cover an outer portion of the housing, the cover may have a tear seam, and the airbag cushion may be deployed while cutting the tear seam when the airbag cushion is deployed.

The airbag cushion may include: a first support portion mounted in the rear frame and configured to be deployed in the rear frame; and an extension portion extending to the outside of the vehicle from the first support portion.

The external airbag system may further include a tether having one end connected to the extension portion, and the other end configured to support the extension portion and connected to the rear frame on which the door of the vehicle is mounted.

The first support portion may extend in a forward/rearward direction of the vehicle, and the extension portion may be bent from the first support portion and extend to the outside of the vehicle.

The external airbag system may further include a sewn part made by sewing an outward bent portion between the first support portion and the extension portion so that the first support portion and the extension portion overlap each other.

The airbag cushion may further include a second support portion protruding from the first support portion toward an interior of the vehicle so as to be in contact with the rear frame, the second support portion being configured to support the extension portion.

According to the airbag for a vehicle according to the present invention, when the opened state of the door is detected and an object moving from the rear side of the vehicle to the lateral side of the vehicle at which the door is opened is detected, the airbag cushion may be deployed to prevent the object from colliding with the passenger and the door.

In addition, in the case in which the object is a two-wheeled vehicle, the airbag cushion may also protect the driver of the two-wheeled vehicle.

In addition, according to another embodiment of the present invention, the airbag cushion has an inverted 'C' shape toward the front side of the vehicle as the plurality of panel parts is bent by the plurality of bent parts. Therefore, the driver of the external object is loaded in the direction in which the airbag cushion is bent, which makes it possible to protect the driver of the external object.

In addition, the panel part is provided in the form of a panel, and the rim part and the bent part are formed in a cushion shape, which makes it possible to reduce costs.

In addition, the lattice part having a lattice-shaped cushion is formed on the panel part, which makes it possible to increase the impact damping force of the airbag cushion.

DETAILED DESCRIPTION

Figure 1:
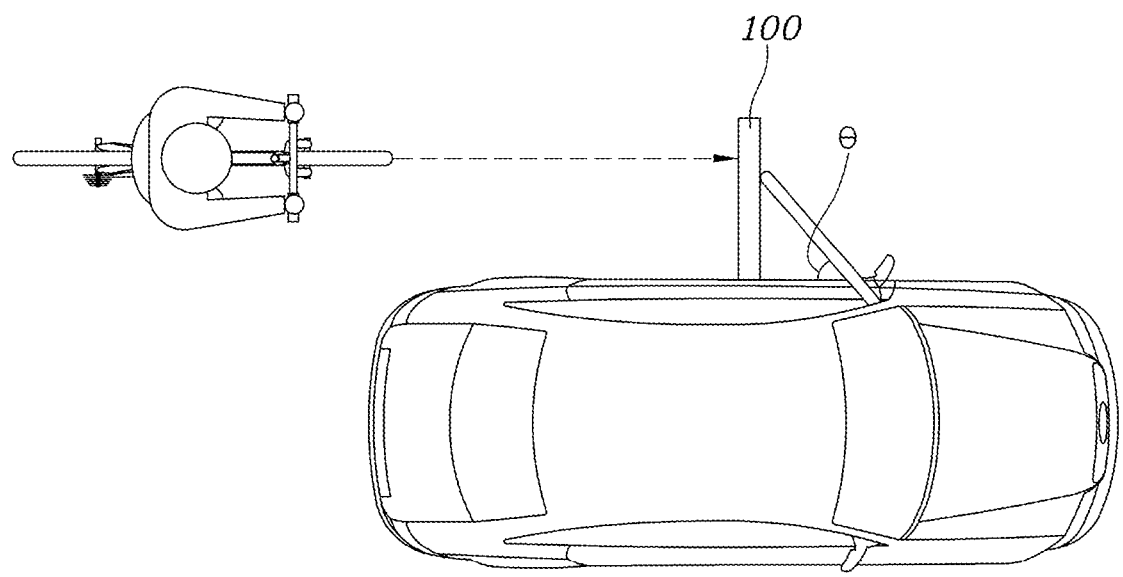
FIG. 1 is a top plan view illustrating a state in which an external airbag for a vehicle according to an embodiment of the present invention is deployed.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and "second" may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

A control unit (20) according to an exemplary embodiment of the present invention may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors FIG. 1 is a top plan view illustrating a state in which an external airbag for a vehicle according to an embodiment of the present invention is deployed, FIG. 2 is a perspective view illustrating the external airbag for a vehicle according to the embodiment of the present invention, FIG. 3 is a configuration view illustrating the external airbag for a vehicle according to the embodiment of the present invention, and FIG. 4 is a cross-sectional view illustrating a state in which the external airbag for a vehicle according to the embodiment of the present invention is deployed.

Exemplary embodiments of an external airbag system for a vehicle according to the present invention will be described with reference to FIGS. 1 to 4.

The external airbag system for a vehicle according to the present invention includes: a detection sensor 10 configured to detect an object moving at a rear or lateral side of a vehicle; an airbag cushion 100 provided on a frame (e.g., a rear frame) of the vehicle, on which a door of the vehicle is mounted, the airbag cushion 100 being configured to be deployed to extend in a direction substantially perpendicular to a forward direction of the vehicle in a state in which the door of the vehicle is opened; and the control unit 20 configured to perform control to deploy the airbag cushion 100 when the detection sensor 10 detects the object.

Figure 2:
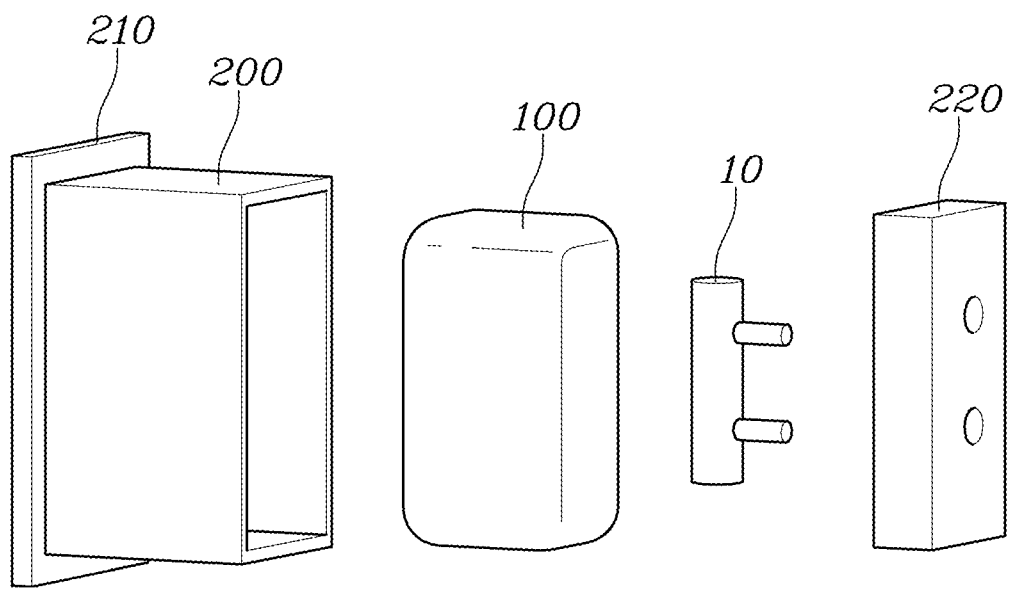
FIG. 2 is a perspective view illustrating the external airbag for a vehicle according to the embodiment of the present invention.
Figure 3:
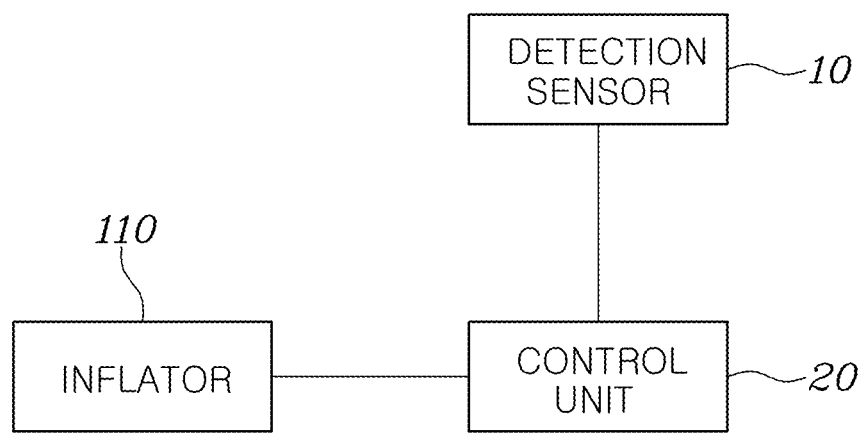
FIG. 3 is a configuration view illustrating the external airbag for a vehicle according to the embodiment of the present invention.
Figure 4:
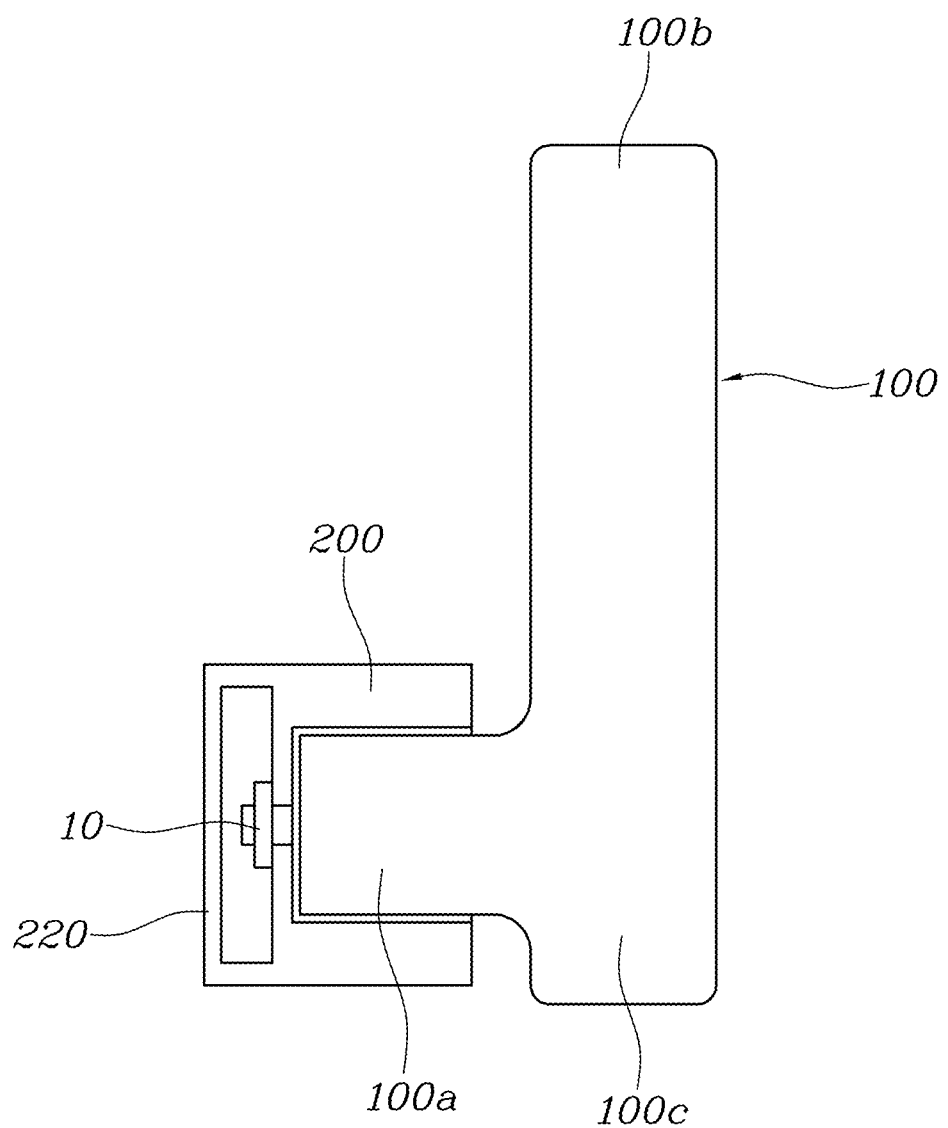
FIG. 4 is a cross-sectional view illustrating a state in which the external airbag for a vehicle according to the embodiment of the present invention is deployed.

As illustrated in FIGS. 1 to 3, the detection sensor 10 may detect an object that moves from the rear side to the lateral side of the vehicle. The detection sensor 10 may be an ultrasonic sensor, a radar sensor, or a camera sensor disposed outside or inside the vehicle. The radar or camera sensor may detect a movement speed of an object moving from the rear side to the lateral side of the vehicle. The ultrasonic sensor may detect a position of an object that approaches the vehicle.

The airbag cushion 100 may be mounted on the rear frame on which the door of the vehicle is mounted. The airbag cushion 100 may be deployed only in a state in which the door is opened.

As illustrated in FIG. 1, the airbag cushion 100 may be deployed laterally from the rear frame of the door and come into contact with an object moving from the rear side to the lateral side of the vehicle, thereby protecting the door of the vehicle or a passenger getting out of the vehicle.

In general, the rear frame of the door may be a B-pillar or a C-pillar of the frame of the vehicle. The airbag cushion 100 may be mounted on the B-pillar or the C-pillar.

The control unit 20 may be connected to the detection sensor 10. The control unit 20 may deploy the airbag cushion 100 when the detection sensor 10 detects an object moving from the rear or lateral rear side of the vehicle to the lateral side of the vehicle and the door of the vehicle is opened.

In general, the object may be a two-wheeled vehicle or a bicycle that travels at the lateral side of the vehicle when the door is opened after the vehicle is stopped.

Therefore, the airbag cushion 100 is deployed in a situation in which the vehicle is stopped and the passenger opens the door and gets out of the vehicle. Therefore, it is possible to prevent the object moving to the lateral side of the vehicle from colliding with the opened door or the passenger getting out of the vehicle, thereby protecting the passenger or preventing damage to the door.

In addition, in a case in which the object moving to the lateral side of the vehicle is a two-wheeled vehicle, it is also possible to prevent an injury to a driver of the two-wheeled vehicle.

The external airbag system may further include an inflator 10 connected to the airbag cushion and configured to deploy the airbag cushion 100 by injecting gas into the airbag cushion 100.

As illustrated in FIG. 3, the inflator 10 may be connected directly to the airbag cushion 100 and mounted on the rear frame together with the airbag cushion 100, and the door of the vehicle may be mounted on the rear frame.

The control unit 20 is connected to the inflator 10. When the detection sensor 10 detects the movement of the object, the control unit 20 may operate the inflator 10 when the door of the vehicle is detected as being opened.

Therefore, the inflator may operate by receiving a signal of the control unit 20 and quickly inject the gas into the airbag cushion 100.

The control unit 20 may detect an opening angle of the door of the vehicle. When the door is opened at a preset opening angle or more and the detection sensor 10 detects the object, the control unit may deploy the airbag cushion 100.

The control unit 20 may be connected to a door opening/closing system configured to open or close the door. In a case in which the opening angle of the door is equal to or larger than an angle of the door that may come into contact with the object moving to the lateral side of the vehicle or in a case in which the door is opened at an angle equal to or larger than an opening angle of the door when the airbag cushion 100 may be deployed, the control unit may deploy the airbag cushion 100 when the detection sensor 10 detects the object moving from the rear or lateral rear side of the vehicle to the lateral side of the vehicle at which the door is opened.

Therefore, the deployment of the airbag cushion 100 is restricted when the opening angle of the door is small, when the object does not collide with the door, or when a space in which the airbag cushion 100 is to be sufficiently deployed is insufficient. Therefore, it is possible to prevent unnecessary consumption of the airbag cushion 100.

The control unit 20 may deploy the airbag cushion 100 when the detection sensor 10 detects the object moving from the rear side to the lateral side of the vehicle and the door of the vehicle is opened.

The control unit 20 may perform control to deploy the airbag cushion 100 immediately when the detection sensor 10 detects the object moving from the rear or lateral rear side of the vehicle to the lateral side of the vehicle and the passenger opens the door to the lateral side of the vehicle at which the object moves.

Therefore, the airbag cushion 100 is quickly deployed when the object moving from the rear side to the lateral side of the vehicle is detected and the door of the vehicle is opened suddenly. Therefore, it is possible to prevent damage to the door or injury to the passenger.

Figure 5:
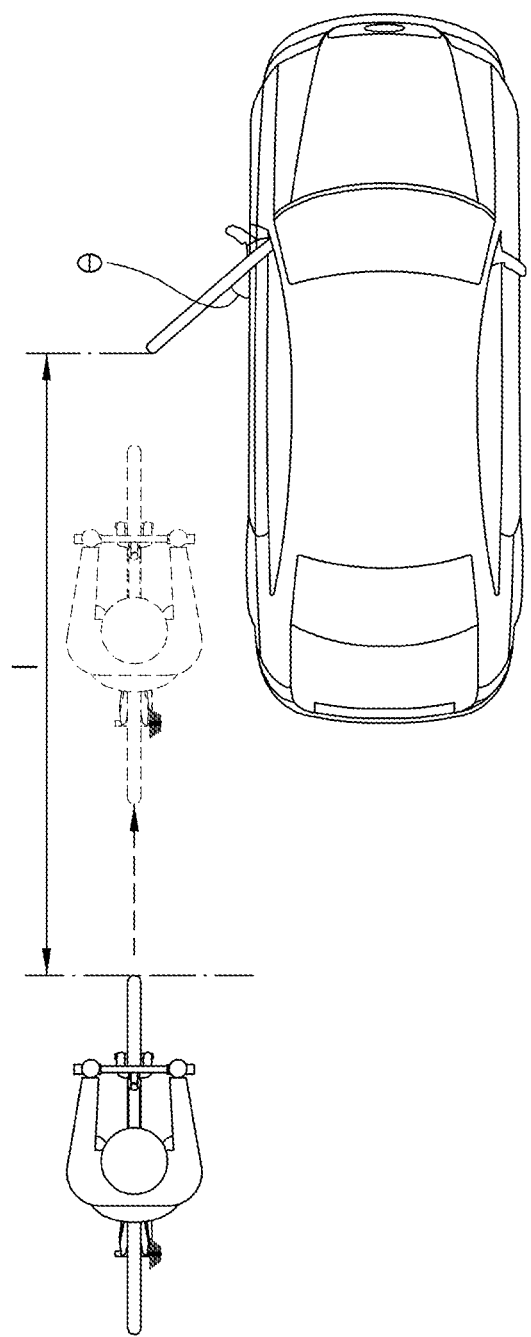
FIG. 5 is a view illustrating a state in which an object moves from a rear side to a lateral side of a vehicle.
Figure 6:
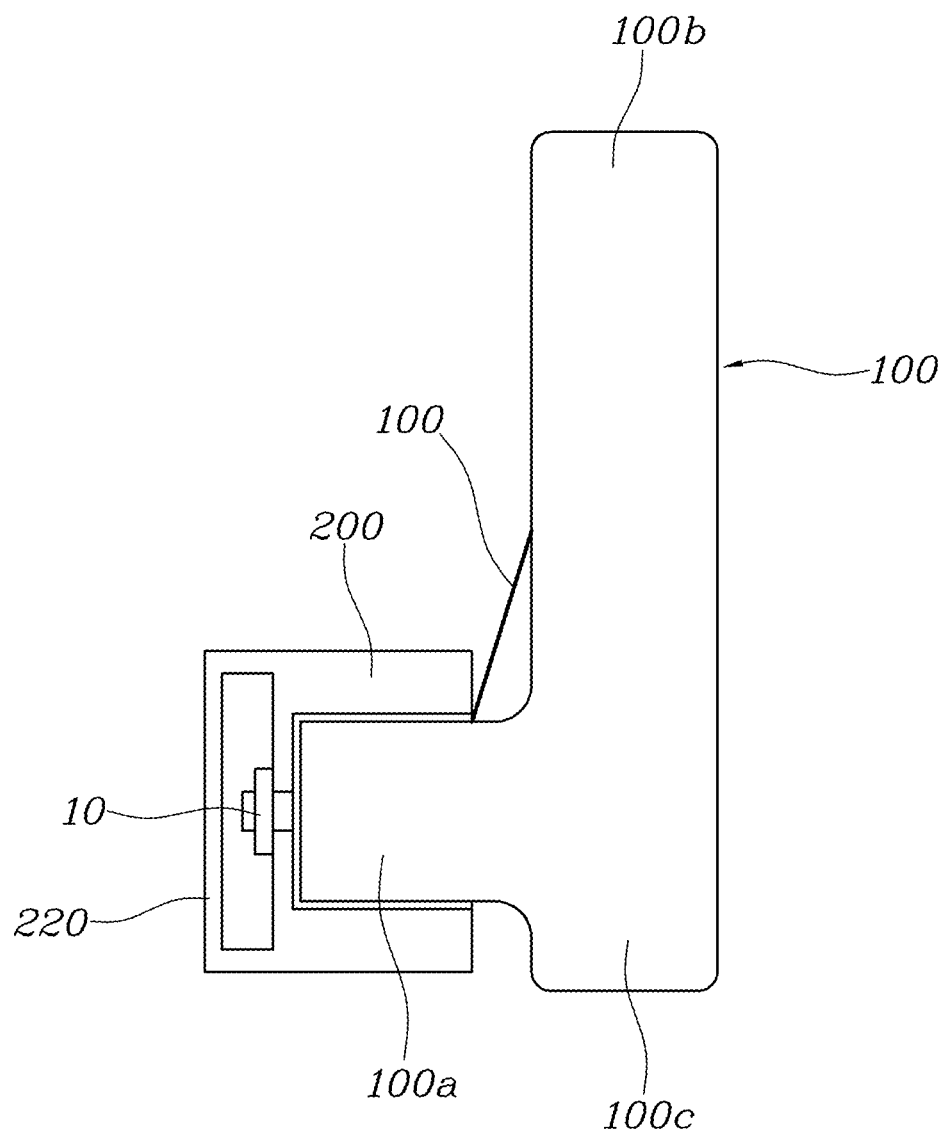
FIGS. 6 to 7 are views illustrating various examples of the external airbag for a vehicle according to the embodiment of the present invention.
Figure 7:
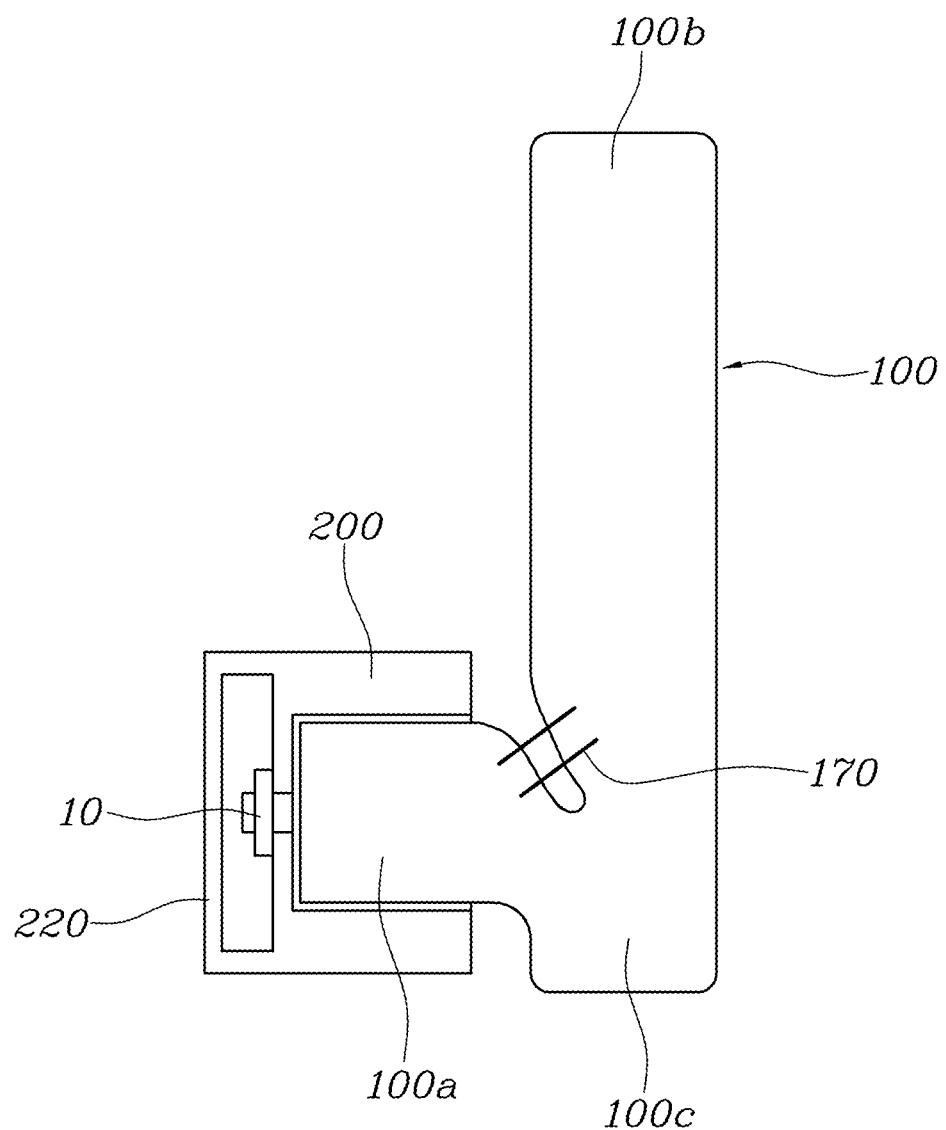

FIG. 5 is a view illustrating a state in which an object moves from the rear side to the lateral side of the vehicle, and FIGS. 6 to 7 are views illustrating various examples of the external airbag for a vehicle according to the embodiment of the present invention.

The control unit 20 may deploy the airbag cushion 100 when the detection sensor 10 detects the object moving from the rear side to the lateral side of the vehicle and the detection sensor 10 detects that the object moves so that a relative distance between the object and the door is a preset braking distance or less.

As illustrated in FIG. 5, the detection sensor 10 may detect a movement position and a movement speed of the object, and the control unit 20 calculates a braking distance of the object on the basis of the movement speed of the object detected by the detection sensor 10. The control unit may perform control to deploy the airbag cushion 100 when the object is continuously detected as approaching the vehicle at a constant speed without being braked even within the braking distance and the door of the vehicle is opened at the preset opening angle or more.

Therefore, the airbag cushion 100 is not deployed when the driver of the two-wheeled vehicle or the object moving from the rear side to the lateral side of the vehicle recognizes the situation in which the door of the vehicle is opened or being opened and reduces the movement speed or stops the two-wheeled vehicle or the object. Therefore, it is possible to prevent unnecessary consumption of the airbag cushion 100.

The external airbag system may further include: a housing 200 configured to house or accommodate the airbag cushion 100 therein; and a mounting unit 220 coupled to the housing 200 and mounted on the rear frame on which the door of the vehicle is mounted.

As illustrated in FIG. 2, the airbag cushion 100 is folded or rolled and accommodated in the housing 200. After the airbag cushion 100 is connected to the inflator 10, the mounting unit 220 and the housing 200 are coupled and mounted on the rear frame on which the door of the vehicle is mounted.

Therefore, the mounting unit 220 and the housing 200 may be mounted on the B-pillar or the C-pillar of the vehicle, which makes it possible to prevent the airbag cushion 100 from being contaminated or damaged by external foreign substances.

The housing 200 includes a cover 210 configured to cover an outer portion of the housing. The cover 210 has a tear seam, such that the airbag cushion 100 may be deployed while tearing off or cutting the tear seam when the airbag cushion 100 is deployed.

The housing 200 may be mounted in the rear frame, and the cover 210 may be disposed outside the housing 200 and cover the outer portion of the housing 200. The tear seam is formed on the cover 210 and extends in the upward/downward direction of the vehicle. The tear seam is cut when the airbag cushion 100 is deployed. Therefore, the airbag cushion 100, which is folded or rolled and accommodated in the housing 200, may be quickly deployed to the outside of the vehicle without a separate opening device.

The airbag cushion 100 may include: a first support portion 100*a* mounted in the rear frame and configured to be deployed in the rear frame; and an extension portion 100*b* extending from the first support portion 100*a* to the outside of the vehicle.

As illustrated in FIG. 4, the airbag cushion 100 may include the first support portion 100*a* deployed in the housing 200, and the extension portion 100*b* extending from the first support portion 100*a* to the outside of the vehicle. The first support portion 100*a* may be inflated by the gas in the internal space of the housing 200, and the extension portion 100*b* may communicate with the first support portion 100*a* and be deployed to the outside of the vehicle.

Since the first support portion 100*a* is positioned inside the housing, the extension portion 100*b* positioned outside the housing 200 may be supported without swaying, which makes it possible to increase a supporting force of the extension portion 100*b*. The extension portion 100*b* may extend to the outside of the vehicle and come into contact with the object moving to the lateral side of the vehicle.

The external airbag system may further include a tether 160 having one end connected to the extension portion 100*b*, and the other end configured to support the extension portion 100*b* and connected to the rear frame on which the door of the vehicle is mounted.

As illustrated in FIG. 6, one end of the tether 160 may be connected to one side of the extension portion, and the other end of the tether 160 may be coupled to the housing 200 or the rear frame of the vehicle, such that the tether 160 may support the extension portion 100*b*.

Therefore, when the driver of the two-wheeled vehicle or the object is loaded onto the extension portion 100*b*, the tether 160 may support the extension portion 100*b*, thereby preventing the extension portion 100*b* from moving toward the front side of the vehicle.

The first support portion 100*a* may extend in a forward/rearward direction of the vehicle, and the extension portion 100*b* may be bent from the first support portion 100*a* and extend to the outside of the vehicle.

As illustrated in FIG. 4, the first support portion 100*a* may extend in a direction substantially parallel to the forward direction of the vehicle, and the extension portion 100*b* may be bent from the first support portion 100*a* and deployed to the outside of the vehicle.

Therefore, the airbag cushion 100 may be mounted on the rear frame without being exposed to the outside of the vehicle. The first support portion 100*a* and the extension portion 100*b* are connected in the directions intersecting each other, which makes it possible to increase the supporting force of the first support portion 100*a*.

The external airbag system may further include a sewn part 170 made by sewing an outward bent portion between the first support portion 100*a* and the extension portion 100*b* so that the first support portion 100*a* and the extension portion 100*b* overlap each other.

As illustrated in FIG. 7, the sewn part 170 may be provided by sewing one surface of the first support portion 100*a* and one surface of the extension portion 100*b* at a portion disposed outside the vehicle and provided at a position at which the extension portion 100*b* is bent from the first support portion 100*a*.

The sewn part 170 may support the forward bending of the extension portion 100*b* when the extension portion 100*b* comes into contact with the object. Therefore, it is possible to reduce the amount of impact transmitted to the door of the vehicle or the passenger getting out of the vehicle when the object is loaded onto the extension portion 100*b*.

The airbag cushion further includes a second support portion 100*c* protruding from the first support portion 100*a* toward the interior of the vehicle so as to be in contact with the rear frame. The second support portion 100*c* supports the extension portion 100*b*.

As illustrated in FIGS. 4, 6, and 7, the second support portion 100*c* may protrude toward the interior of the vehicle from an inner end of the extension portion 100*b* or a front side of the first support portion 100*a*.

When the object moving from the rear side of the vehicle to the lateral side of the vehicle at which the door of the vehicle is opened is detected, the airbag cushion may be deployed. When the object moving from the rear side toward the extension portion 100*b* comes into contact with and is loaded onto the extension portion 100*b*, the extension portion 100*b* of the airbag cushion may rotate forward relative to the first support portion 100*a*.

In this case, the second support portion 100*c* may protrude from an end of the extension portion 100*b* toward the interior of the vehicle and be supported on the rear frame.

Therefore, the rotation of the extension portion 100*b* may be supported, and impact of the object may be attenuated.

Figure 8:
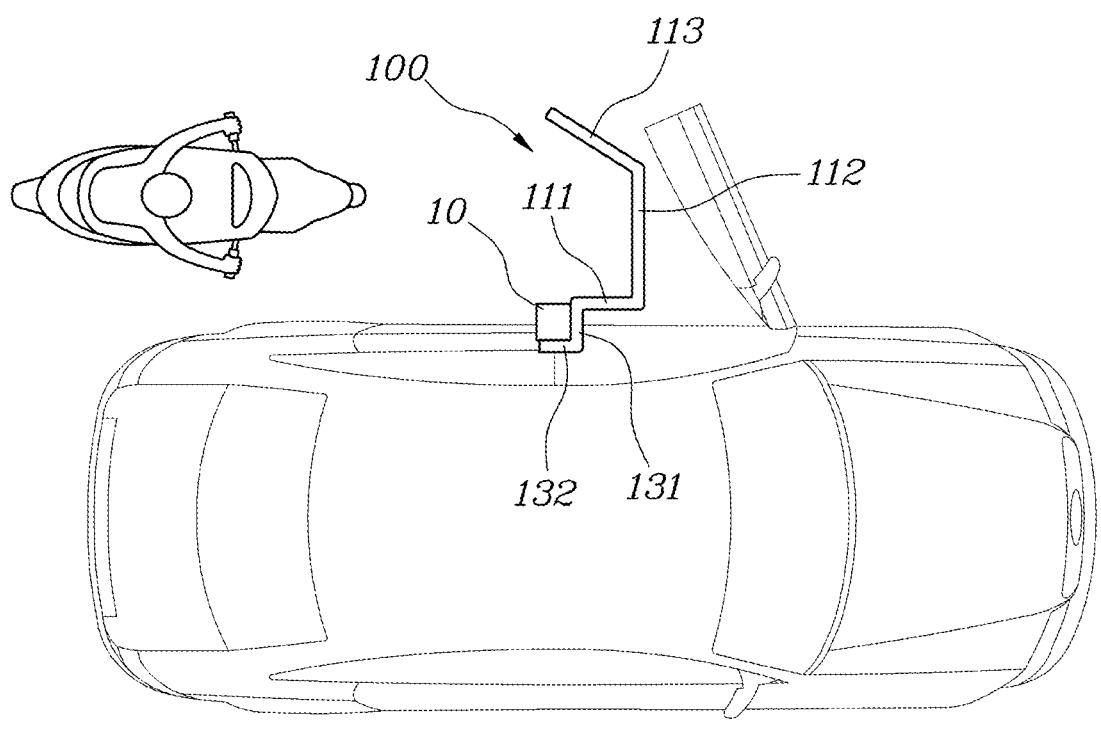
FIG. 8 is a top plan view illustrating an external airbag for a vehicle according to another embodiment of the present invention.
Figure 9:
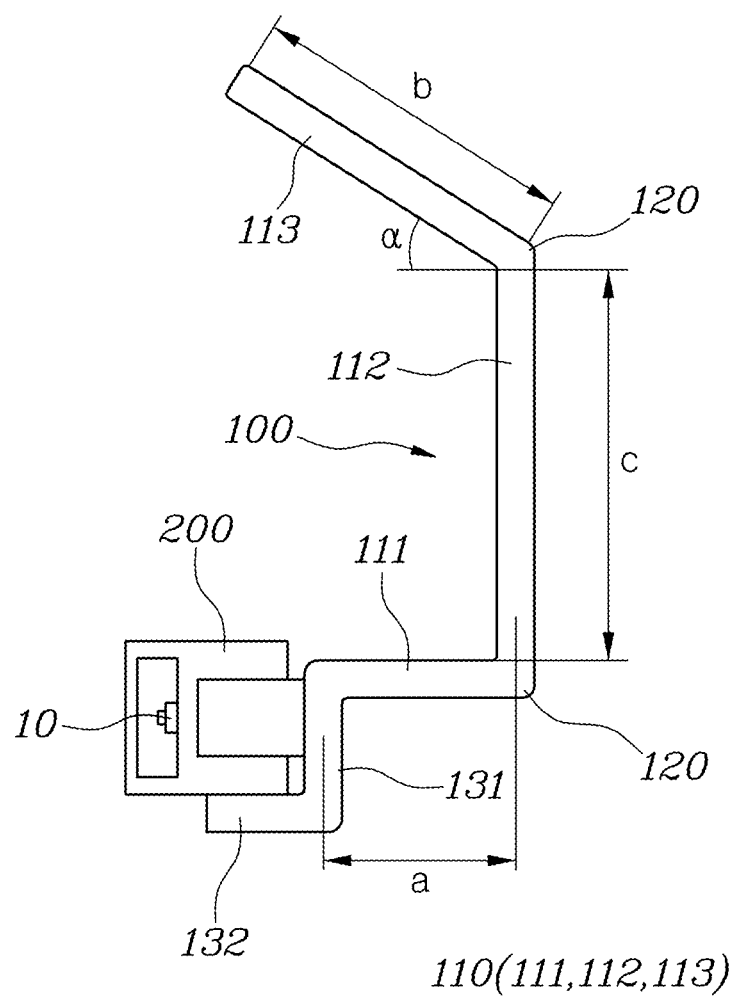
FIG. 9 is a cross-sectional plan view illustrating the external airbag for a vehicle according to another embodiment of the present invention.

FIG. 8 is a top plan view illustrating an external airbag for a vehicle according to another embodiment of the present invention, and FIG. 9 is a cross-sectional plan view illustrating the external airbag for a vehicle according to another embodiment of the present invention.

Another embodiment of the external airbag for a vehicle according to the present invention will be described with reference to FIGS. 8 to 9.

The external airbag for a vehicle according to the present invention includes: an inflator 10 configured to inject gas when operating and coupled to a rear pillar among the pillars on which the door of the vehicle is mounted; and an airbag cushion 100 provided on the rear pillar together with the inflator 10 and configured such that a plurality of panel parts 110 connected by bent parts 120 is deployed toward a space between the rear pillar and the opened door as the gas injected from the inflator 10 in a state in which the door of the vehicle is opened, such that an object moving from the rear side of the door toward the door is loaded onto the airbag cushion 100.

The inflator 10 is mounted on the rear pillar of the frame on which the door of the vehicle is mounted. The airbag cushion 100 is connected to the inflator 10 and mounted on the rear pillar together with the inflator 10. The airbag cushion 100 may be deployed to the outside of the vehicle when the inflator 10 operates.

The rear pillar of the vehicle may be a B-pillar or a C-pillar of the vehicle. The rear pillar of the vehicle may also be a D-pillar in a case in which doors are additionally mounted.

As illustrated in FIG. 8, the airbag cushion 100 includes the plurality of panel parts 110. The panel parts 110 may be connected to one another by means of the bent parts 120 extending vertically and deployed to the outside of the vehicle. Therefore, the airbag cushion 100 may be deployed to the outside of the vehicle in the state in which the door of the vehicle is opened.

The airbag cushion deployed to the outside of the vehicle in a shape in which the plurality of panel parts 110 is bent toward the front side of the vehicle by the bent parts 120.

Figure 14:
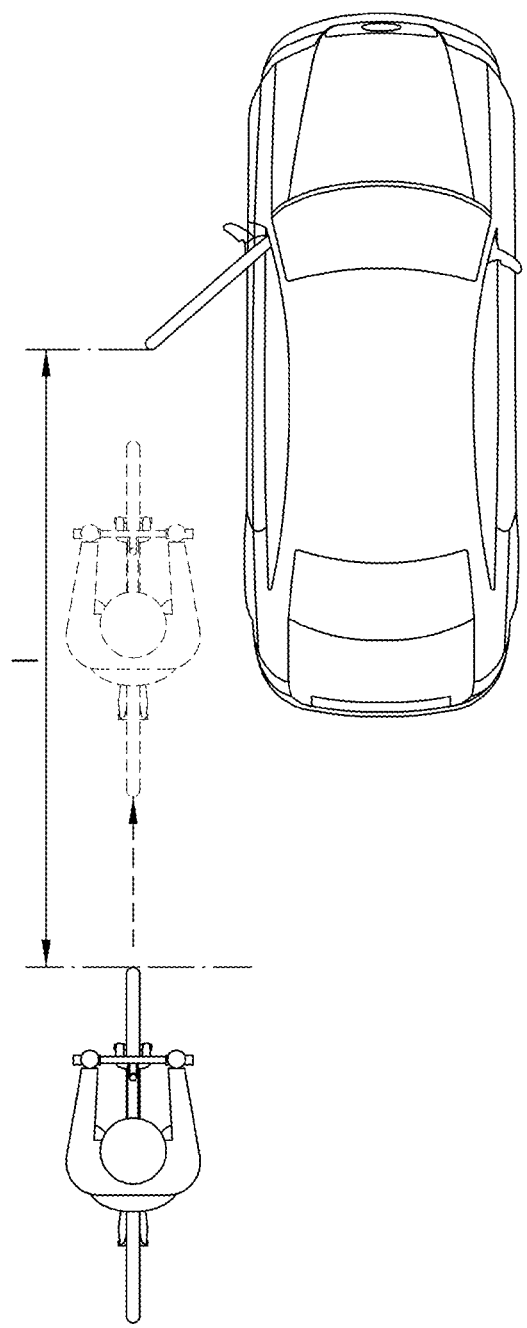
FIG. 14 is a view illustrating a state in which a rear object is detected.

FIG. 14 is a view illustrating a state in which a rear object is detected.

The vehicle is equipped with a detection sensor 30 configured to detect an object moving from the rear or lateral side of the vehicle. The inflator 10 may deploy the airbag cushion 100 while operating on the basis of a signal for opening the door of the vehicle and information on detection of the object moving toward the door detected by the detection sensor 30.

As illustrated in FIG. 14, the detection sensor 30 may detect the object moving from the rear side to the lateral side of the vehicle, and the airbag cushion 100 may be deployed in the state in which the door of the vehicle is opened. When the object moves from the rear side of the vehicle toward the side at which the door of the vehicle is opened, the airbag cushion 100 is deployed between the rear pillar and the door of the vehicle from the rear pillar, such that the object moving to the lateral side of the vehicle may be loaded onto the airbag cushion 100.

Therefore, the airbag cushion 100 may protect the opened door of the vehicle or the passenger getting out of the vehicle from the collision with the object.

In a case in which the object moving to the lateral side of the vehicle is a two-wheeled vehicle, there is a driver of the two-wheeled vehicle. When the two-wheeled vehicle comes into contact with the airbag cushion 100, the driver of the two-wheeled vehicle is loaded onto a portion concaved toward the front side of the vehicle by an inverted 'C' shape of the airbag cushion 100 defined by the plurality of panel parts 110 and the bent parts 120. Therefore, it is possible to more safely protect the driver of the two-wheeled vehicle.

The external airbag may further include a housing 200 configured to accommodate the folded or rolled airbag cushion 100, and the inflator 10, together with the airbag cushion 100, may be mounted in the housing 200. The housing 200 may be mounted on the rear pillar.

As illustrated in FIG. 9, the inflator 10 may be mounted in the housing 200, and the airbag cushion 100 may be folded and rolled in a state of being connected to the inflator 10 and accommodated in the housing 200.

In the state in which the inflator 10 and the airbag cushion 100 are folded, the housing 200 may be mounted on the rear pillar. Therefore, the airbag cushion 100 may be deployed from the rear pillar of the vehicle.

The panel part 110 includes: a first panel 111 configured to be deployed toward the front side of the vehicle from the rear pillar, a second panel 112 configured to be deployed to the outside of the vehicle from an end of the first panel 111, and a third cushion configured to be deployed rearward from the end of the second panel 112. The object moving from the rear side of the door toward the door may be loaded between the first panel 111, the second panel 112, and the third panel 113.

As illustrated in FIGS. 8 to 9, the airbag cushion 100 may include the three panels. The respective panels are bent by the bent parts 120, such that the airbag cushion 100 may have an inverted 'C' shape toward the front side of the vehicle.

The panel part 110 may include: the first panel 111 extending toward the front side of the vehicle from the rear pillar; the second panel 112 bent at the end of the first panel 111 and extending to the outside of the vehicle, and the third panel 113 bent at the end of the second panel 112 by the bent part 120 and extending toward the rear side of the vehicle. When the two-wheeled vehicle is loaded onto the airbag cushion 100, the driver of the two-wheeled vehicle may be loaded between the first panel 111, the second panel 112, and the third panel 113.

Lengths (a, b, and c) of the first panel 111, the second panel 112, and the third panel 113 may be set depending on the length of the door of the vehicle.

In addition, a bending angle made by the bent part 120 may also be set. FIGS. 1 to 2 illustrate that an angle between the first panel 111 and the second panel 112 is 90 degrees. However, the angle may be changed depending on the type of vehicle or the size of the door.

In a first embodiment of the airbag cushion 100 according to the present invention, the panel part 110 may be deployed in a cushion shape as the gas is injected into the panel part 110 from the inflator 10.

The panel part 110 may have a cushion shape that expands when the gas is injected. All the plurality of panel parts 110 may be formed in the cushion shape, such that the object moving from the rear side to the lateral side may be loaded onto the panel parts 110 having the cushion shape.

Therefore, it is possible to maximize the reduction in amount of impact applied to the door of the vehicle or the passenger getting out of the vehicle when the object comes into contact with the airbag cushion 100.

In a second embodiment of the airbag cushion 100, the airbag cushion 100 further includes rim parts 140 each having a cushion shape and disposed on rims of the panel parts 110. The gas is injected into the rim parts 140 from the inflator 10. The panel part 110 may be provided in the form of a panel having a surface shape, and the object may be loaded onto the panel part 110.

Figure 10:
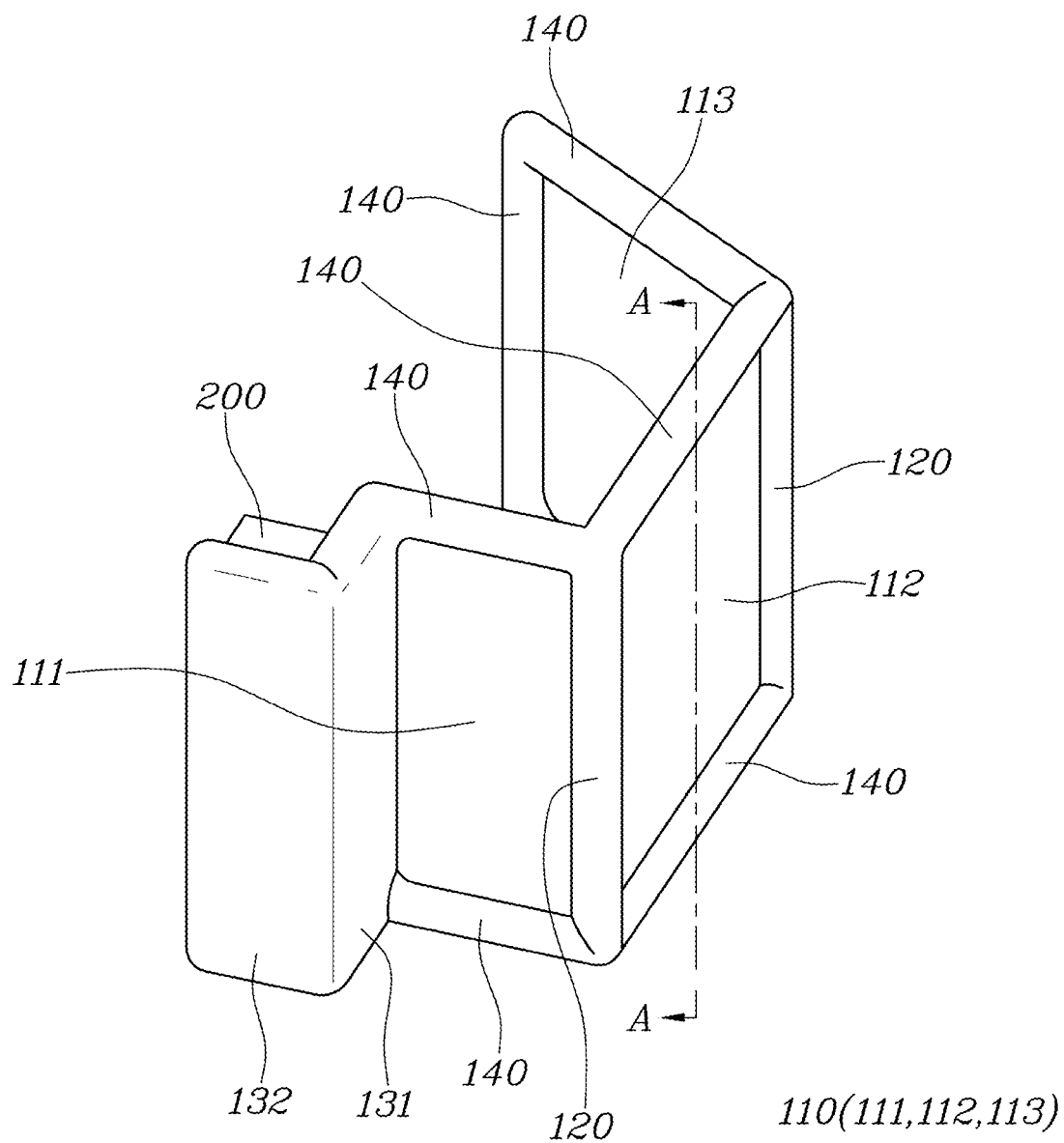
FIG. 10 is a perspective view illustrating a second embodiment of the external airbag for a vehicle according to another embodiment of the present invention.
Figure 11:
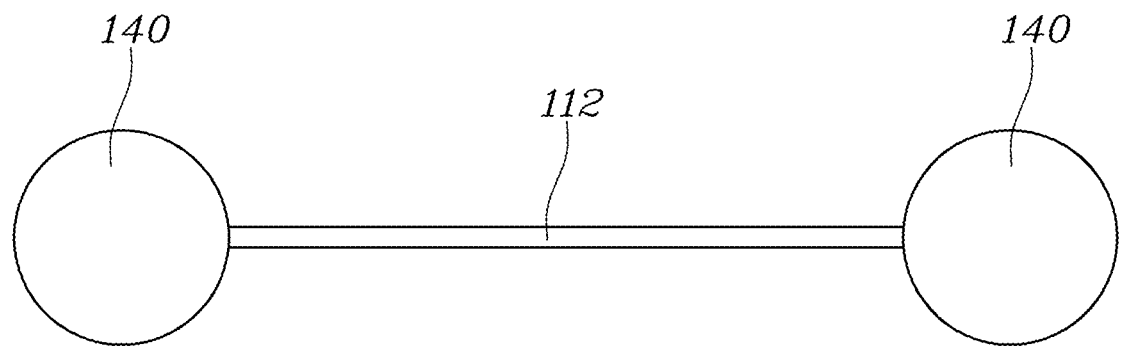
FIG. 11 is a cross-sectional view taken along line A-A in FIG. 10.

FIG. 10 is a perspective view illustrating the second embodiment of the external airbag for a vehicle according to another embodiment of the present invention, and FIG. 11 is a cross-sectional view taken along line A-A in FIG. 10.

As illustrated in FIGS. 10 to 11, the panel part 110 may be provided in the form of a panel having a surface shape. The rim part 140 may be provided along an outer rim of the panel part 110 and have the cushion shape. Therefore, the airbag cushion 100 may be deployed as the gas generated by the inflator 10 is injected into the rim part 140. As the rim parts are expanded, the panel parts 110 may have the inverted 'C' shape.

Therefore, a gas capacity of the inflator 10 may be reduced, which may reduce costs. Further, the airbag cushion 100 may be quickly deployed along the rim parts 140.

In addition, the bent part 120 may communicate with the rim part 140, have a cushion shape, and extend in the upward/downward direction of the vehicle.

As illustrated in FIGS. 10 to 11, the bent part 120 may extend in the upward/downward direction of the vehicle and have a cushion shape that communicates with the rim part 140.

Therefore, an outer portion of the panel part 110 having the surface shape may be supported by the rim part 140. Since the bent parts 120, which connects the plurality of panels spaced apart from one another, each have the cushion shape, it is possible to in contact with the supporting force of the panel parts 110. In addition, since the bent parts 120 and the rim parts 140 communicate with one another, the airbag cushion 100 may be quickly deployed. Further, it is possible to reduce the gas capacity of the inflator 10 and decrease the costs of the airbag cushion 100 in comparison with the configuration in which the entire panel part 110 has the cushion shape.

Next, in a third embodiment of the airbag cushion 100, the airbag cushion 100 may further include lattice parts 150 disposed on the panel parts 110, extending in a lattice shape, and communicating with the rim parts 140 and the bent parts 120 so that the gas is injected into the lattice parts 150.

Figure 12:
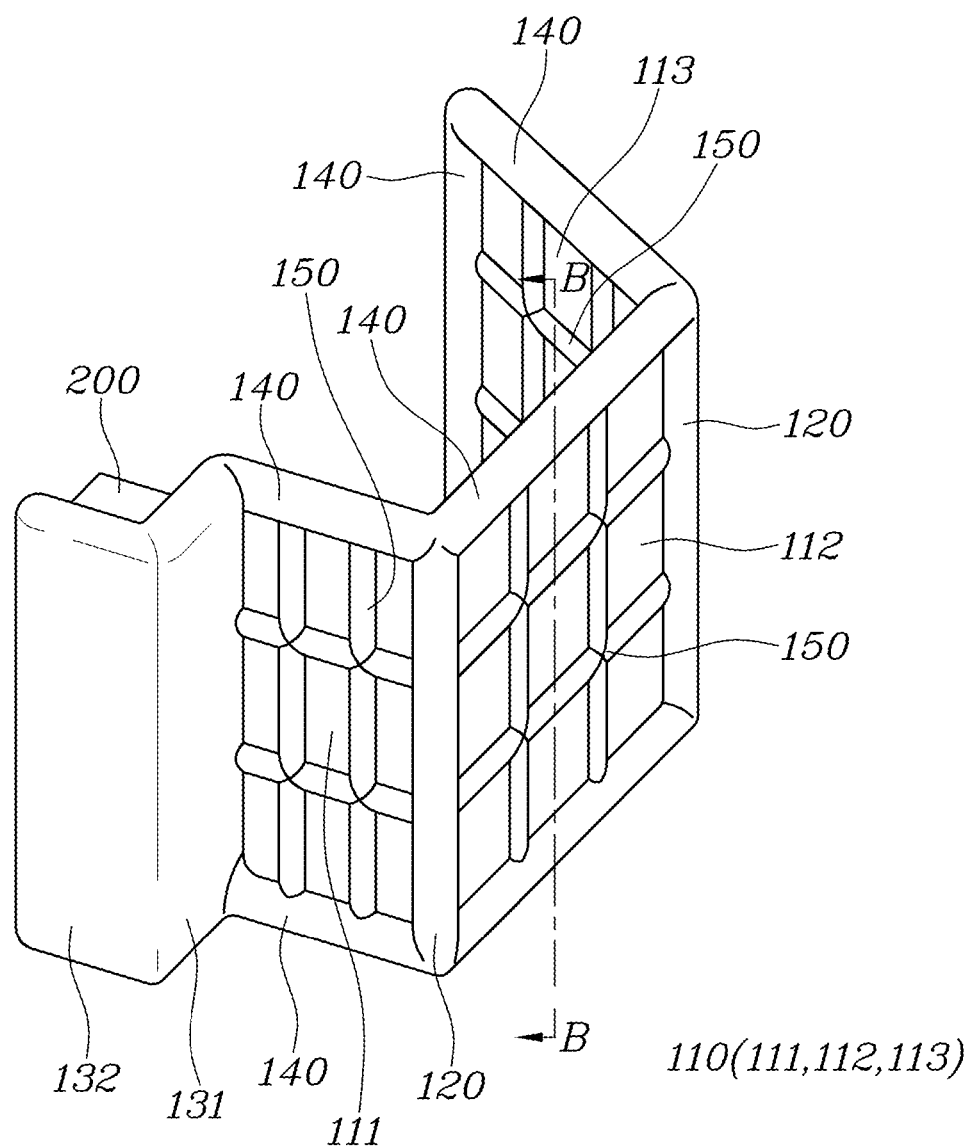
FIG. 12 is a perspective view illustrating a third embodiment of the external airbag for a vehicle according to another embodiment of the present invention.
Figure 13:
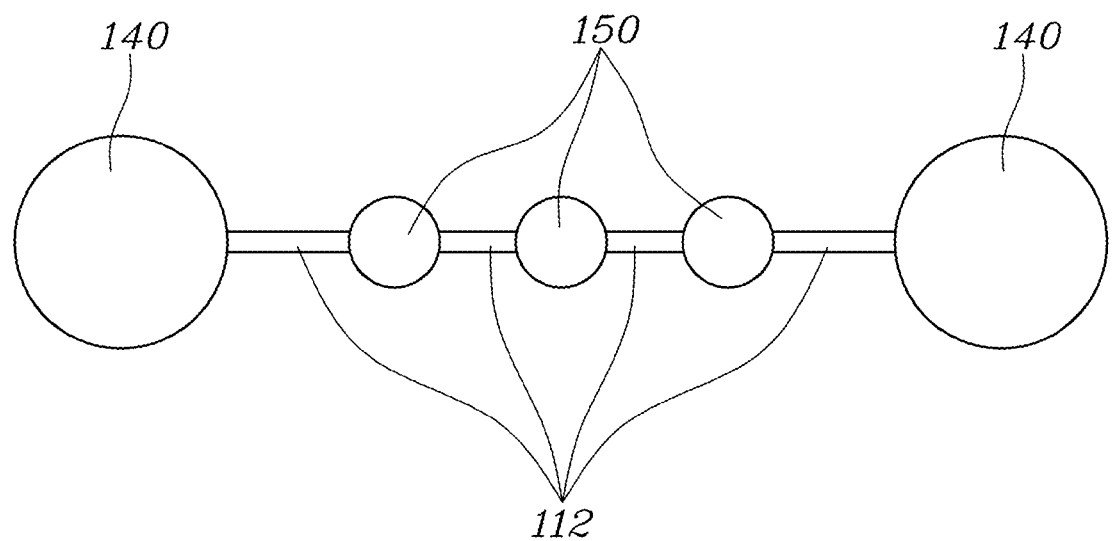
FIG. 13 is a cross-sectional view taken along line B-B in FIG. 5.

FIG. 12 is a perspective view illustrating a third embodiment of the external airbag for a vehicle according to another embodiment of the present invention, and FIG. 13 is a cross-sectional view taken along line B-B in FIG. 12.

As illustrated in FIGS. 12 to 13, the lattice part 150 may be formed on an inner surface of the panel part 110 and have a lattice shape. The lattice part 150 may be expanded as the gas injected into the lattice part 150 from the inflator 10. Ends of the lattice parts 150 may be connected to the rim parts 140 or the bent parts 120.

Since the lattice part 150 is formed on the panel part 110 of the surface shape, the cushion properties of the panel part 110 may be improved. Further, it is possible to reduce the force when the object moving from the rear side to the lateral side of the vehicle is loaded onto the panel part 110.

The plurality of lattice parts 150 may be positioned to be spaced apart from one another at predetermined intervals.

As illustrated in FIGS. 6 to 12, the lattice parts 150 may be disposed to be spaced apart from one another at the predetermined intervals. Since the plurality of lattice parts 150 is provided, it is possible to improve the reduction in impact of the panel part 110.

The airbag cushion 100 may further include a first support part 131 extending from the rear pillar in a leftward/rightward direction of the vehicle, and the gas may be injected into the first support part 131. The panel part 110 may extend from an outer end of the first support part 131.

As illustrated in FIG. 9, the airbag cushion 100 may have the first support part 131 extending in the leftward/rightward direction of the vehicle from the front side of the rear pillar as the gas is injected into the first support part 131 from the inflator 10.

The first support part 131 extends in the leftward/rightward direction of the vehicle from the front side of the rear pillar. The panel part 110 extends from one end of the first support part 131. Therefore, the first support part 131 may support the movement of the panel part 110 in the forward/rearward direction of the vehicle when the object comes into contact with and is loaded onto the panel part 110.

In addition, the airbag cushion 100 may further include a second support part 132 extending from an inner end of the first support part 131 toward the rear side of the vehicle, and the gas is injected into the second support part 132.

The second support part 132 may extend toward the rear side of the vehicle from the other side of the first support part 131 extending in the leftward/rightward direction of the vehicle. The second support part 132 may come into contact with a lateral surface of the rear pillar adjacent to the interior of the vehicle.

Therefore, the second support part 132 comes into contact with the rear pillar when the object comes into contact with and is loaded onto the panel part 110. Therefore, the second support part 132 may support the movement of the panel part 110 in the leftward/rightward direction of the vehicle.

The lengths of the first and second support parts 131 and 132 may be set depending on the type of vehicle or the thickness of the rear pillar.

While the specific embodiments of the present invention have been illustrated and described above, it will be obvious to those skilled in the art that the present invention may be variously modified and changed without departing from the technical spirit of the present invention defined in the appended claims.

What is claimed is:

1. An external airbag system for a vehicle, comprising:
   a detection sensor configured to detect an object near a rear or lateral side of a vehicle;
   an airbag cushion provided on a frame of the vehicle and configured to deploy in a direction substantially perpendicular to a forward direction of the vehicle; and
   a control unit configured to cause the airbag cushion to be deployed when the door of the vehicle is opened and the detection sensor detects the object moving at the rear or lateral side of the vehicle.

2. The external airbag system of claim 1, further comprising an inflator coupled to the airbag cushion and configured to inject a gas into the airbag cushion.

3. The external airbag system of claim 1, wherein the control unit is configured to:
   detect an opening angle of the door of the vehicle; and
   deploy the airbag cushion when the opening angle of the door is equal to or greater than a preset angle and the detection sensor detects the object moving at the rear or lateral side of the vehicle.

4. The external airbag system of claim 1, wherein the control unit is configured to deploy the airbag cushion when the detection sensor detects the object moving from the rear side to the lateral side of the vehicle and the door of the vehicle is opened.

5. The external airbag system of claim 4, wherein the control unit is configured to deploy the airbag cushion when the detection sensor detects that a distance between the object and the door is equal to or less than a preset distance.

6. The external airbag system of claim 1, further comprising:
   a housing configured to house the airbag cushion; and
   a mounting unit coupled to the housing and mounted on the frame.

7. The external airbag system of claim 6, wherein:
   the housing comprises a cover having a tear seam, and
   the airbag cushion is configured to tear off the tear seam when deployed.

8. The external airbag system of claim 1, wherein the airbag cushion comprises:
a first support portion positioned in the frame and configured to deploy in the frame; and
an extension portion extending from the first support portion and configured to deploy outwardly from the vehicle.

9. The external airbag system of claim 8, further comprising a tether including:
a first end connected to the extension portion; and
a second end connected to the frame and configured to support the extension portion.

10. The external airbag system of claim 8, wherein:
the first support portion is configured to deploy in a direction substantially parallel to the forward direction of the vehicle, and
the extension portion has a bent portion coupled to the first support portion.

11. The external airbag system of claim 10, wherein the first support portion and the extension portion overlap each other.

12. The external airbag system of claim 8, wherein the airbag cushion further comprises a second support portion protruding from the first support portion toward an interior of the vehicle, in contact with the frame, and configured to support the extension portion.

13. The external airbag system of claim 1, wherein:
the airbag cushion comprises a plurality of panel parts and a plurality of bent parts, each bent part conjoining a neighboring pair of the panel parts, and
the airbag cushion is deployed toward a space between a rear pillar of the vehicle and the opened door of the vehicle.

14. The external airbag system of claim 13, wherein the plurality of panel parts comprises:
a first panel configured to deploy toward a front side of the vehicle from the rear pillar of the vehicle;
a second panel coupled to the first panel and configured to deploy outwardly from the vehicle; and
a third cushion coupled to the second panel and configured to deploy toward the rear side of the vehicle, and
wherein the first, second and third panels are configured to catch the object moving toward the opened door from a rear side of the opened door when deployed.

15. The external airbag system of claim 13, wherein:
the airbag cushion further comprises a rim part provided on a rim of the panel par and configured to be inflated when supplied with a gas injected from an inflator, and
the panel part has a panel shape when deployed.

16. The external airbag system of claim 15, wherein the bent part is coupled to the rim part and extends vertically when deployed.

17. The external airbag system of claim 15, wherein the airbag cushion further comprises a lattice part disposed on the panel part, the lattice part having a lattice shape, coupled to the rim part and the bent part, and configured to inflate when the gas is injected.

18. The external airbag system of claim 13, wherein:
the airbag cushion further comprises a first support part configured to deploy from the rear pillar of the vehicle in the direction substantially perpendicular to the forward direction of the vehicle when supplied with a gas injected from an inflator, and
the plurality of panel parts is coupled to and extends from a first end portion of the first support part.

19. The external airbag system of claim 18, wherein the airbag cushion further comprises a second support part extending from a second end portion of the first support part to the frame of the vehicle and configured to inflate when supplied with the gas injected from the inflator.

* * * * *